April 22, 1930.　　　W. J. DENNIS　　　1,755,687
WEATHER STRIPPING
Filed Feb. 21, 1927
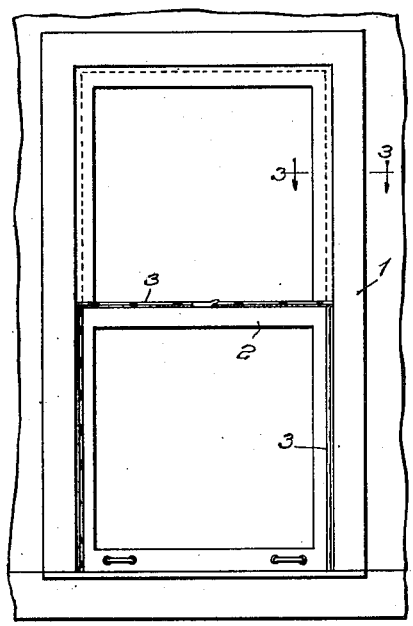
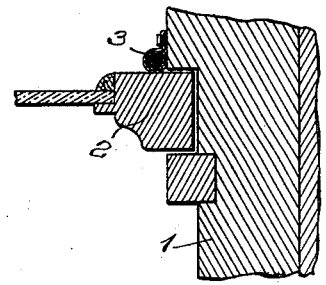
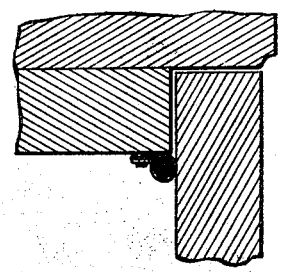
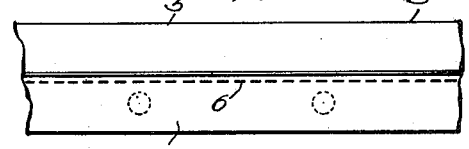
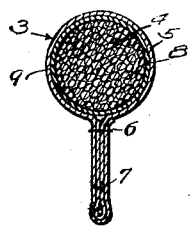
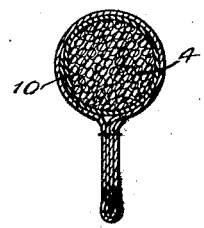
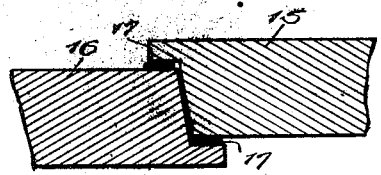
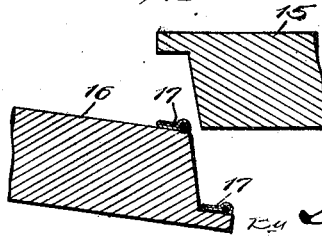
Witness:
William P. Kilroy
Inventor:
William J. Dennis Patented Apr. 22, 1930

1,755,687

UNITED STATES PATENT OFFICE

WILLIAM J. DENNIS, OF CHICAGO, ILLINOIS

WEATHER STRIPPING

Application filed February 21, 1927. Serial No. 170,034.

This invention relates to new and useful improvements in weather stripping or gaskets, and more particularly that type of device which is especially applicable to doors, windows, refrigerator doors or the like, and has for its object to provide stripping of this character which may be readily applied to a window or door to create a tight fit or seal between the said window or door and the casing therefor and at the same time prevent rattling of the door or window.

Another object of my invention is the provision of weather stripping of the above character which can be quickly and readily applied and when in applied position will prevent the passage of dust, air, rain or snow around the door or window.

Gaskets or weather stripping of this general type have heretofore been constructed with a filler of suitable material such as cotton wicking or the equivalent and covered with a rubberized fabric, the fabric being wrapped around the filler and stitched in proximity thereto with the edges constructed to form a flange. While initially the rubberized fabric as heretofore employed is substantially moisture-proof, in time, owing to exposure and wear, this may deteriorate to the extent that moisture can penetrate the same and the body becomes damp and soggy, loosing its resiliency, although it may be satisfactory as a retaining container.

My present invention has as an object the production of inner or supplemental enclosure for a more or less flexible filler body which will prevent moisture reaching the filler body or core, whereby the body retains its resiliency and insulating properties. Preferably for the purpose I employ a good quality of sheet rubber of the desired thickness which completely encloses the core and at all times prevents the admission of moisture to the core. This supplemental covering being enclosed within the outer cover, is to a large extent protected against wear, retains its elasticity and has long life without deterioration. As long as the outer covering endures to retain the parts assembled, the interior covering will protect the core against moisture.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

Fig. 1 is an elevation of a window illustrating the application of my improved weather stripping;

Fig. 2 is a detail elevation of a portion of the weather stripping;

Fig. 3 is a detail section on the line 3—3 of Fig. 1;

Fig. 4 is a similar section illustrating the application of the stripping to a door;

Fig. 5 is a transverse sectional view of the stripping;

Fig. 6 is a view similar to Fig. 5, illustrating a modification;

Fig. 7 is a sectional view of a portion of a cooler or like door and door frame with my gasket applied thereto, the door being closed; and Fig. 8 is a similar view, the door partially open.

In carrying out my invention, it will be understood that the filler body may be either in the form of a rope of cotton, hemp, jute or other material suitable for the purpose, or may be of equivalent material according to the requirements, the body of the filler being enclosed with a flexible cover sheet having its edges extending beyond one side of the body and folded to form a securing flange, while the filler body is preferably additionally encased in a waterproof or non-absorbent covering.

In the present instance, Figs. 2, 4 and 6, inclusive, illustrate embodiments of my invention and include in its construction the selection of the type of filler body to be preferred. In Fig. 1, 1 indicates a window casing with a sash 2 therein and 3 indicates the weather stripping applied to the window casing and bearing against the sash 2.

In Figs. 5 and 6, the filler body illustrated is preferably of a rope or wick of cotton, hemp, jute or the like and indicated at 4. This particular type of filler body may after a certain extent of use lose its resiliency and assume a rather compact position if dampness enters the outer covering for the filler, thus reducing the efficiency of the weather stripping and increasing the deterioration of the same.

The main cover 5 for the filler body 4 is preferably of rubberized cloth, or any other similar material cut in strips of suitable length and width and folded longitudinally around the filler body 4 so that the body 4 is preferably positioned within the fold and the edges of the strip are arranged in parallel relation, thence folded upon themselves and stitched together as shown at 6, producing a tubular enclosing portion with a substantially four-ply attaching flange 7. Any equivalent style of multiple ply flange may be employed, that shown being a desirable type.

The filler body 4, as shown in Figs. 5 and 6, is encased in a casing of rubber as shown at 8, or other suitable waterproof material may be used if found desirable. In Fig. 5, it will be noted that the casing 8 is so arranged that its longitudinal edges are in abutting relation at 9 and the edges when brought together are preferably positioned some distance away from the folded portion of the cover 5 so that in case moisture should penetrate through the folded portions of the cover it will not enter directly into the casing 8 and be absorbed by the fabric filler body. In Fig. 6, it will be noted that in order to increase the efficiency of the casing 8 the longitudinal edges thereof are overlapped as shown at 10, thus reducing to a minimum the possibility of moisture entering the casing 8.

It will be apparent from the foregoing that I have provided a simple and inexpensive type of weather stripping wherein the filler body is of a fabric rope and is so enclosed within the cover and the casing as to prevent moisture from penetrating to the interior of the casing, thus decreasing the efficiency of the filler body.

In Figs. 7 and 8 I have illustrated the gasket, indicated at 17, as applied to a cooler door 16, and arranged to form a seal between the door and the door frame 15. The device is particularly suitable for this type of installation.

While I have illustrated different modifications, it will be appreciated that various types of filler bodies, as well as different types of supplemental covers, may be used upon the interior of the cover 5. The main feature of the present invention is the provision of a waterproof casing or supplemental cover adapted to be arranged within the body cover 5 and which will prevent moisture from reaching the core within the supplemental cover so as to eliminate the possibility of deterioration of the filler or core and at the same time not reduce in any way whatever the efficiency of the stripping or gasket itself.

It will be apparent from the foregoing that as I have provided a supplemental enclosure or cover which is impervious to moisture and will prevent moisture from reaching the filler body or core. From this construction, it will be apparent that if the filler body or core is of fabric or other material affected by moisture, it will be preserved in an active state a considerable length of time.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A weather stripping having a yieldable filler body, a flexible outer cover for said filler body with edges extending in contacting relation transversely of said body and folded backward toward and terminating adjacent said body portion, a single row of stitching through the four ply structure thus formed, said stitching adjacent and substantially parallel to said body portion to form an attaching flange, and a supplemental cover of rubber disposed between said cover and said filler body and enclosing said filler body to provide a moisture proof casing for said filler body.

2. A weather stripping having a yieldable filler body of absorbent material, a flexible outer cover for said filler body with edges extending in contacting relation transversely of said body, one edge being folded in overlapping relation to the other of said edges and terminating adjacent said body portion, a single row of stitching through the projecting edges thus formed, said stitching adjacent and substantially parallel to said body portion to form an attaching flange, and a supplemental cover of rubber disposed between said cover and said filler body and enclosing said filler body to provide a moisture-proof casing for said filler body.

In testimony whereof, I have hereunto signed my name.

WILLIAM J. DENNIS.